July 9, 1957     F. W. KUHAGEN ET AL     2,798,696
FOOD MIXER
Filed Feb. 10, 1955
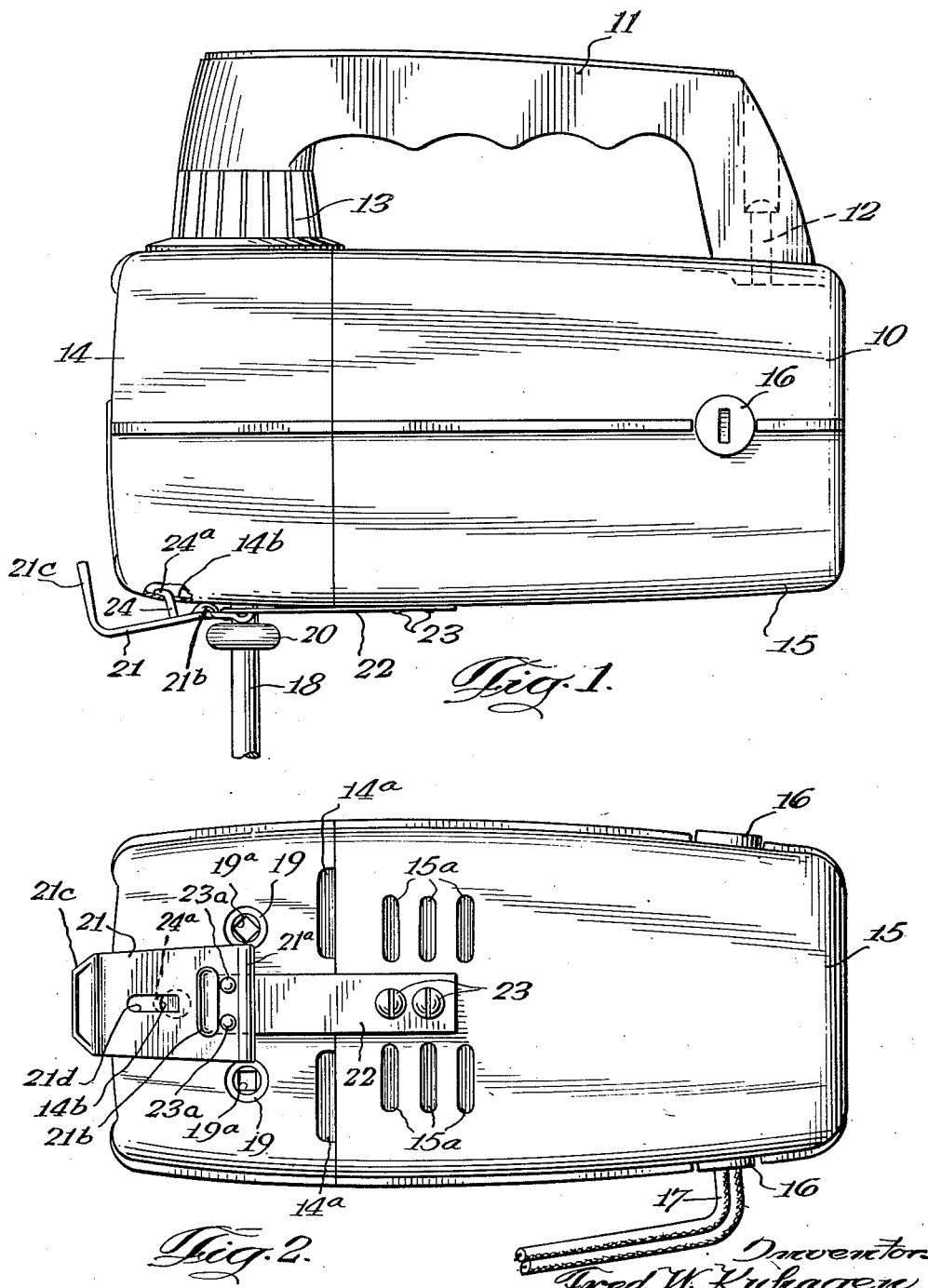

United States Patent Office 2,798,696
Patented July 9, 1957

2,798,696

FOOD MIXER

Fred W. Kuhagen and Ansel D. Miller, Chicago, Ill., assignors to Birtman Electric Company, a corporation of Illinois Application February 10, 1955, Serial No. 487,382

3 Claims. (Cl. 259—1)

This invention relates to a food mixer having a beater ejector associated therewith.

Substantially all food mixers of the household type now used employ at least one rotatable beater releasably attached to the mixer body, with this beater being rotatable during the mixing operation. In the usual construction, the beater is retained by a latch spring or equivalent means and in order to detach the beater, a force must be exerted to disengage the inner end of the beater from the latching means.

The invention here is concerned with a beater ejector by means of which a lever action is employed to move the beater initially away from the mixer body so as to disengage the inner end of the beater from the retaining means. The beater may then be easily withdrawn completely from engagement with the mixer body.

The invention will be described as related to the embodiment shown in the accompanying drawings. Of the drawings:

Fig. 1 is a side elevational view, partially broken away for clarity of illustration, of a mixture embodying the invention, with the beater nearer to the observer removed for clarity of illustration and with the lower portion of the other beater broken away.

Fig. 2 is a bottom view of the mixer body of Fig. 1, but omitting the pair of beaters.

The food mixer shown in the accompanying drawings comprises a mixer body 10 having at the top thereof an elongated handle 11 held in place on the body by attaching means including a bolt 12. Located at the front of the handle is a rotatable speed control knob 13 that is accessible from the handle 11. The mixer body 10 includes a front casing portion 14 and a rear casing portion 15. The rear casing portion 15 is adapted to contain motor brush holder end caps 16. The electric line 17 to the mixer extends through the rear portion of the rear casing 15.

The bottom surface of the rear casing portion 15 is provided with a plurality of ventilating openings 15a while the rear edge of the front casing portion 14 is also provided with ventilating openings 14a.

Releasably retained within the front casing portion 14 of the mixer is a pair of rotatable beaters having shafts 18. Each beater shaft 18 is adapted to be held within a rotatable tube 19 whose lower end is exposed through the bottom of the front casing portion 14 as shown in Fig. 2. The upper end of each rotatable tube 19 is of square construction as indicated at 19a. The inner end of each beater shaft 18a is of similar square construction so that the beater will rotate with the tube. In the usual construction, the tube 19 also has associated therewith releasable catch means such as a spring for releasably retaining the beater in position. These and other construction details are shown and described in the copending application of Fred W. Kuhagen, Serial No. 512,774, filed June 2, 1955.

The above described details of a food mixer including the mixer body 10, handle 11, speed control knob 13, casing portions 14 and 15, brush holders, beaters, spring beater retaining means and the like are similar to corresponding features of food mixers that have been used for a long period of time and are illustrated in the above mentioned copending application.

In order to aid in removing the beaters 18 from engagement with the retaining means and so that they can be withdrawn from the mixer by hand, the present invention provides an improved beater ejector. This beater ejector which is adapted to engage annular collars 20 attached to the beater shaft 18 includes a lever member in the form of an elongated metal strip 21 and a spring means, here shown as an elongated leaf spring 22. The leaf spring 22 has one end attached to the rear casing portion 15 by means of a pair of screws 23 and extends forwardly of the food mixer body. The front end of the spring 22 is attached to the rear end of the lever 21 as by a pair of rivets 23a.

The rear end of the lever 21 is deformed outwardly to provide a transverse ridge 21a which is adapted to bear against the inner edges of the collars 20 in the manner shown in Fig. 1. This first ridge 21a operates as a force applying portion for engaging the beater to move it away from the mixer body on operation of the lever 21.

The lever 21 is also provided with a second transverse ridge 21b adjacet to the first ridge 21a and located inwardly thereof. This second ridge 21b is formed by displacing a portion of the lever 21 upwardly. This second ridge 21b bears against the bottom of the front casing portion 14 and operates as a fulcrum around which the lever may be moved against the resistance of the leaf spring 22.

In order to limit the extent of outward movement of the lever 21 away from the mixer body, there is provided a finger 24 struck from the lever 21 and extending through an opening 14b in the bottom of the front casing portion 14. This finger 24 has a bent inner end 24a that is adapted to engage the inner surface of the front casing portion 14 to limit the extent of outward movement of the lever 21.

The lever 21 is provided with an upwardly extending hand engageable portion 21c located at the front of the mixer body. When it is desired to eject the beaters from the mixer, the front portion of the lever 21 is engaged with the hand and moved toward the mixer body. This rotates the rear end of the lever around the fulcrum ridge 21b and thus moves the rear ridge portion 21a away from the bottom surface of the mixer body. As this rear ridge 21a bears against the collars 20 on the beater shafts 18, this moves the beaters 18 outwardly of the mixer. This movement is sufficient to disengage the inner ends of the beater shafts 18 from the locking means so that the beaters may then be withdrawn easily from engagement with the mixer. This movement of the lever 21 serves to distort the spring 22. Then when the lever is released, the spring 22 returns the lever to its initial position as shown in Fig. 1.

As can be seen from the above description, the beater ejector of this invention is lightweight, unobtrusive and efficient in its operation. Furthermore, the parts of the beater serve a plurality of functions. Thus, the spring 22 not only returns the ejector to its normal position when the lever is released, but also serves to mount the lever on the mixer. Furthermore, the lever 21 not only operates to eject the beaters, but also provides the force supplying portion exemplified by the rear ridge 21a and the fulcrum exemplified by the second ridge 21b. The lever also performs the additional function of providing the means for restraining the extent of its forward movement. This restraining means includes the finger 24 which is struck from the lever 21 leaving the opening 21d.

Having described our invention as related to the embodiment shown in the accompanying drawings, it is our intention that the invention be not limited by any of the details of description, unless otherwise specified, but rather be construed broadly within its spirit and scope as set out in the accompanying claims.

We claim:

1. In a food mixer including a mixer body having means for releasably retaining a beater therein, a beater ejector, comprising: an elongated lever positioned on the bottom of said body having an operating portion accessible from the front of the mixer, a force applying portion for engaging a part of the beater and moving the beater away from the mixer on operation of the lever and a fulcrum portion; and a leaf spring having one end attached to the inner end of the lever and the opposite end attached to said body, said spring serving to attach said lever to the body and to retain said lever in operating position, said force applying portion including a first transverse ridge on the side of the lever opposite to the body and located at the end of the lever that is attached to the spring and the fulcrum portion including a second transverse ridge adjacent to said first ridge and on the side of the lever opposite to the side containing the first ridge.

2. In a food mixer including a mixer body having means for releasably retaining a beater therein, a beater ejector, comprising: a combined elongated lever and leaf spring on the bottom of said body, the lever having an operating portion accessible from the front of the mixer and a force applying portion for engaging a part of the beater and moving the beater away from the mixer on movement of the lever and a fulcrum portion bearing against the body and around which the lever is thusly movable, the leaf spring having one end attached to the inner end of the lever and the opposite end attached to said body, said leaf spring serving to attach said lever to the body and to retain said lever in operating position.

3. In a food mixer including a mixer body having means for releasably retaining a beater therein, a beater ejector, comprising: a combined elongated lever and leaf spring on the bottom of said body, the lever having an operating portion accessible from the front of the mixer and a force applying portion for engaging a part of the beater and moving the beater away from the mixer on movement of the lever and a fulcrum portion bearing against the body and around which the lever is thusly movable, the leaf spring having one end attached to the inner end of the lever and the opposite end attached to said body, said leaf spring serving to attach said lever to the body and to retain said lever in operating position; and a movement limiting member on said lever including a finger extending inwardly through an opening in said body and engaging an inner surface thereof.

References Cited in the file of this patent

UNITED STATES PATENTS

| | | |
|---|---|---|
| 2,048,455 | Knapp | July 21, 1936 |
| 2,332,064 | Duffy | Oct. 19, 1943 |